(12) United States Patent
Petefish et al.

(10) Patent No.: US 12,513,179 B2
(45) Date of Patent: Dec. 30, 2025

(54) LIVE EXPLOITATION FEED ON PENETRATION TESTING PORTAL

(71) Applicant: Evolve Security, LLC, Chicago, IL (US)

(72) Inventors: Paul Petefish, Chicago, IL (US); Sam Harris, Lake Forest, IL (US); Tran Le, Chicago, IL (US); Ethan Vernon, Austin, TX (US)

(73) Assignee: Evolve Security, LLC, Chicago, IL (US)

( * ) Notice: Subject to any disclaimer, the term of this patent is extended or adjusted under 35 U.S.C. 154(b) by 295 days.

(21) Appl. No.: 18/330,096

(22) Filed: Jun. 6, 2023

(65) Prior Publication Data
US 2023/0396643 A1 Dec. 7, 2023

Related U.S. Application Data

(60) Provisional application No. 63/349,893, filed on Jun. 7, 2022.

(51) Int. Cl.
*H04L 29/00* (2006.01)
*H04L 9/40* (2022.01)

(52) U.S. Cl.
CPC ................ *H04L 63/1433* (2013.01)

(58) Field of Classification Search
CPC .................................................. H04L 63/1433
See application file for complete search history.

(56) References Cited

U.S. PATENT DOCUMENTS

| | | | |
|---|---|---|---|
| 9,531,745 B1* | 12/2016 | Sharma | G06F 40/205 |
| 9,544,327 B1* | 1/2017 | Sharma | G06N 20/00 |
| 11,678,011 B1* | 6/2023 | Fu | H04N 21/8549 |
| | | | 348/143 |
| 12,236,494 B1* | 2/2025 | Melgar | G06F 21/577 |
| 2007/0169199 A1* | 7/2007 | Quinnell | H04L 63/1433 |
| | | | 726/25 |
| 2012/0314063 A1* | 12/2012 | Cirker | G08B 13/19697 |
| | | | 348/143 |
| 2014/0199663 A1* | 7/2014 | Sadeh-Koniecpol | |
| | | | H04L 63/1408 |
| | | | 434/118 |
| 2014/0199664 A1* | 7/2014 | Sadeh-Koniecpol | |
| | | | G06F 21/564 |
| | | | 434/118 |
| 2016/0191638 A1* | 6/2016 | Zamer | G06F 21/44 |
| | | | 709/224 |
| 2017/0103674 A1* | 4/2017 | Sadeh-Koniecpol | |
| | | | G06F 21/566 |
| 2017/0244746 A1* | 8/2017 | Hawthorn | G06F 21/55 |
| 2017/0318046 A1* | 11/2017 | Weidman | H04L 63/1433 |
| 2017/0346846 A1* | 11/2017 | Findlay | H04L 63/1433 |

(Continued)

*Primary Examiner* — Don G Zhao

(74) *Attorney, Agent, or Firm* — Michael Best & Friedrich LLP

(57) ABSTRACT

A system and a method for reporting penetration test results. The system identifying a vulnerability of a networked system by testing a target of the networked system. Assigning a risk level to the vulnerability. Activating, based on the risk level of the vulnerability, screen recording of a display device of a computing device of a tester. Receiving video data associated with the screen recording of the display device. Generating a client application associated with the testing of the target of the networked system, the client application including a live media feed. Generating using the vulnerability and the video data, a post on the live media feed.

18 Claims, 5 Drawing Sheets

(56) References Cited

U.S. PATENT DOCUMENTS

| | | | | |
|---|---|---|---|---|
| 2018/0338046 A1* | 11/2018 | Hanabusa | ............ | H04M 11/045 |
| 2019/0036958 A1* | 1/2019 | Shi | ...................... | H04L 63/1466 |
| 2020/0218409 A1* | 7/2020 | Hosier, Jr. | ......... | H04M 1/72403 |
| 2020/0242360 A1* | 7/2020 | Alexander | ............. | G06N 20/00 |
| 2020/0314137 A1* | 10/2020 | Tsitkin | ................ | H04L 63/1433 |
| 2020/0356661 A1* | 11/2020 | Stoletny | .............. | H04L 63/1466 |
| 2021/0099478 A1* | 4/2021 | Seetharamaiah | ... | H04L 63/1433 |
| 2021/0217106 A1* | 7/2021 | Hauser | ............... | G06Q 30/0241 |
| 2021/0241595 A1* | 8/2021 | Young | .................... | A62C 37/36 |
| 2021/0264035 A1* | 8/2021 | Gitelman | ................. | G06N 5/04 |
| 2021/0264036 A1* | 8/2021 | Gitelman | .............. | G06F 21/577 |
| 2021/0309183 A1* | 10/2021 | Bielby | ................. | B60R 16/037 |
| 2021/0329165 A1* | 10/2021 | Liu | ..................... | G06F 21/6245 |
| 2022/0131887 A1* | 4/2022 | Ngweta | ............... | H04L 63/1433 |
| 2022/0224721 A1* | 7/2022 | Bertiger | .............. | H04L 41/0681 |
| 2023/0041017 A1* | 2/2023 | Schei | ..................... | G06V 20/41 |
| 2023/0179855 A1* | 6/2023 | Liu | ..................... | H04N 23/611 |
| | | | | 348/222.1 |
| 2023/0208882 A1* | 6/2023 | Crabtree | ............. | H04L 63/1408 |
| | | | | 726/22 |
| 2023/0368206 A1* | 11/2023 | Turgeman | ............... | G06F 21/32 |

* cited by examiner

LIVE EXPLOITATION FEED ON PENETRATION TESTING PORTAL

RELATED APPLICATION

This application claims priority to and the benefit of U.S. Provisional Patent Application No. 63/349,893, filed on Jun. 7, 2022, the entire contents of which is incorporated herein by reference.

BACKGROUND

The present application relates to web-based application for reporting penetration test results.

SUMMARY

Penetration testing is a controlled attack simulation that helps identify susceptibility to application, network, cloud and operating system breaches. Penetration test may be performed with no knowledge or with knowledge and/or privileges. Penetration tests assess vulnerabilities of web applications, external networks, internal networks, wireless based networks, cloud services etc. Vulnerabilities are legal/legitimate operations that allow the execution of an illegal operation, such as, for example, unescaped SQL commands, unchanged hashed passwords in source-visible projects, human relationships, and old hashing or cryptographic functions. Currently, penetration tests provide information related to escalated vulnerabilities, which are reported to security teams to mitigate vulnerabilities and create a control mechanism for an identified attack.

One embodiment provides a server system for reporting penetration results. The system including memory and an electronic processor. The electronic processor configured to identify a vulnerability of a networked system by testing a target of the networked system. The electronic processor also configured to assign a risk level to the vulnerability. The electronic processor also configured to activate, based on the risk level of the vulnerability, screen recording of a display device of a computing device of a tester. The electronic processor further configured to receive video data associated with the screen recording of the display device. The electronic processor also configured to generate a client application associated with the testing of the target of the networked system, the client application including a live media feed. The electronic processor further configured to generate using the vulnerability and the video data, a post on the live media feed.

Another embodiment provides a method of reporting penetration results. The method including identifying, with an electronic processor, a vulnerability of a networked system by testing a target of the networked system. The method further including assigning, with the electronic processor, a risk level to the vulnerability. The method further including activating, with the electronic processor, based on the risk level of the vulnerability, screen recording of a display device of a computing device of a tester. The method also including receiving, with the electronic processor, video data associated with the screen recording of the display device. The method further including generating, with the electronic processor, a client application associated with the testing of the target of the networked system, the client application including a live media feed. The method also including generating, with the electronic processor using the vulnerability and the video data, a post on the live media feed.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. In some embodiments, a cloud-based computing infrastructure may be used in which the various components may be geographically separated between one or more locations. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the application will become apparent by consideration of the detailed description and accompanying drawings.

DETAILED DESCRIPTION

Figure 1:
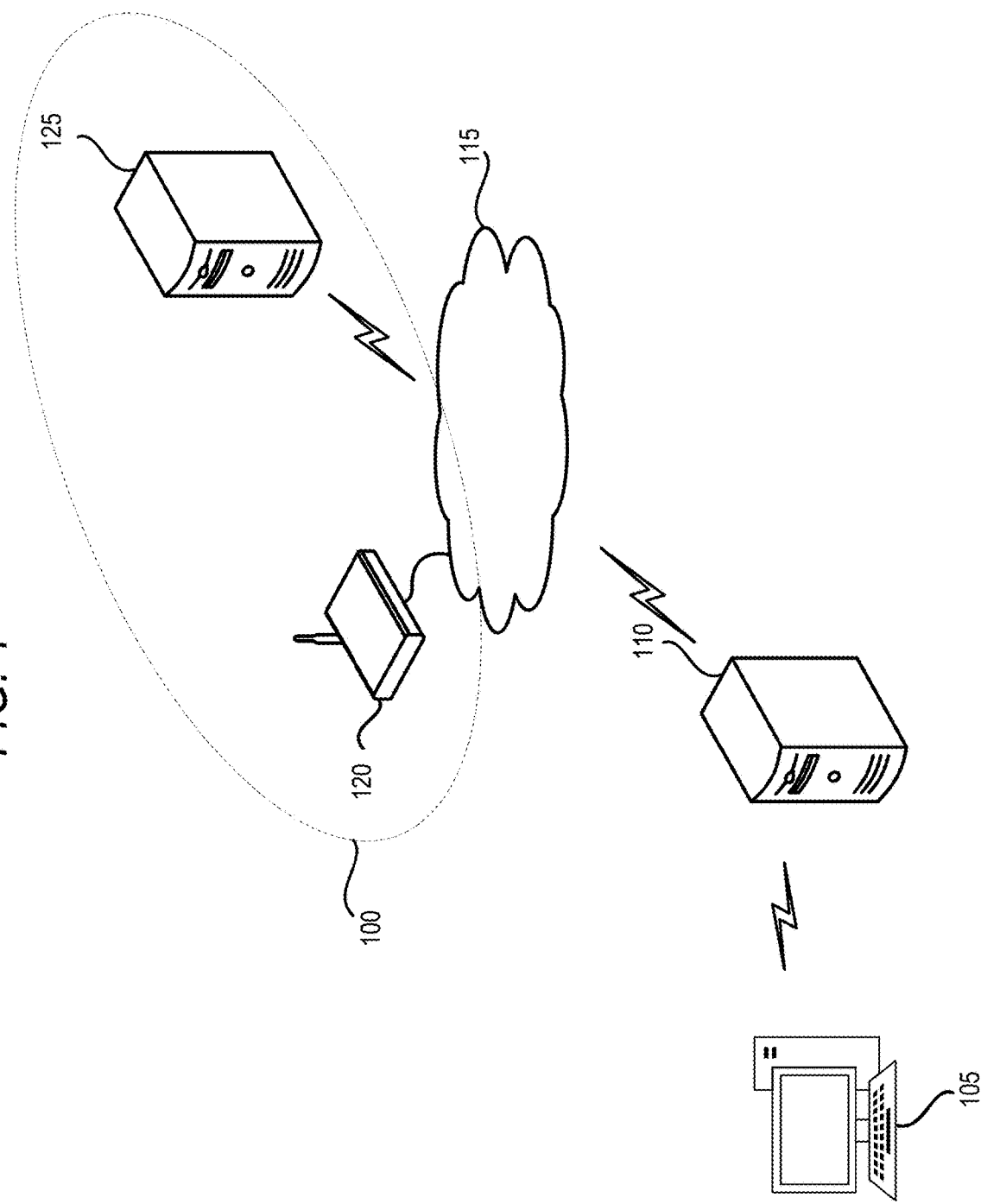
FIG. 1 is a functional block diagram of a penetration testing environment, according to embodiments described herein.

FIG. 1 is a functional block diagram illustrating a networked system 100 including a server for identifying and reporting vulnerabilities of the networked system 100, in accordance with one embodiment. FIG. 1 provides only an illustration of one implementation and does not imply any limitations with regard to the environments in which different embodiments may be implemented. Many modifications to the depicted environment may be made by those skilled in the art without departing from the scope of the present application.

As seen in FIG. 1, the networked system 100 (indicated by a dashed oval in FIG. 1) includes a plurality of network nodes (e.g., router 120 and client server 125) interconnected by one or more networks 115. For clarity, details of the structure of the network nodes are illustrated and described with respect to a single networked system, but may be equally applicable to all other network nodes.

In FIG. 1, the networked system 100, a computing device 105, and a server 110 are all interconnected by the network 115. The network 115 can be, for example, a local area network (LAN), a telecommunications network, a wide area network (WAN), such as the Internet, or any combination of the three, and include wired, wireless, or fiber optic connections. In general, the network 115 can be any combination of connections and protocols that will support communications between the networked system 100, the computing device 105, and the server 110, in accordance with some embodiments.

The computing device 105 is, for example, a laptop computer, a tablet computer, a personal digital assistant ("PDA"), a smart telephone, or another electronic device capable of communicating with the server 110 and providing a user interface. The computing device 105 provides the user interface and allows a tester to access and interact with the server 110 and/or the networked system 100.

In some implementations, the server 110 may be a desktop computer, a computer server, or any other computer systems, known in the art. In some embodiments, the server 110 represents computer systems utilizing clustered computers and components (e.g., database server computers, application server computers, cloud servers, etc.), which act as a single pool of seamless resources when accessed by the networked system 100. In general, the server 110 is representative of any electronic device or combination of electronic devices capable of executing computer readable program instructions.

Figure 2:
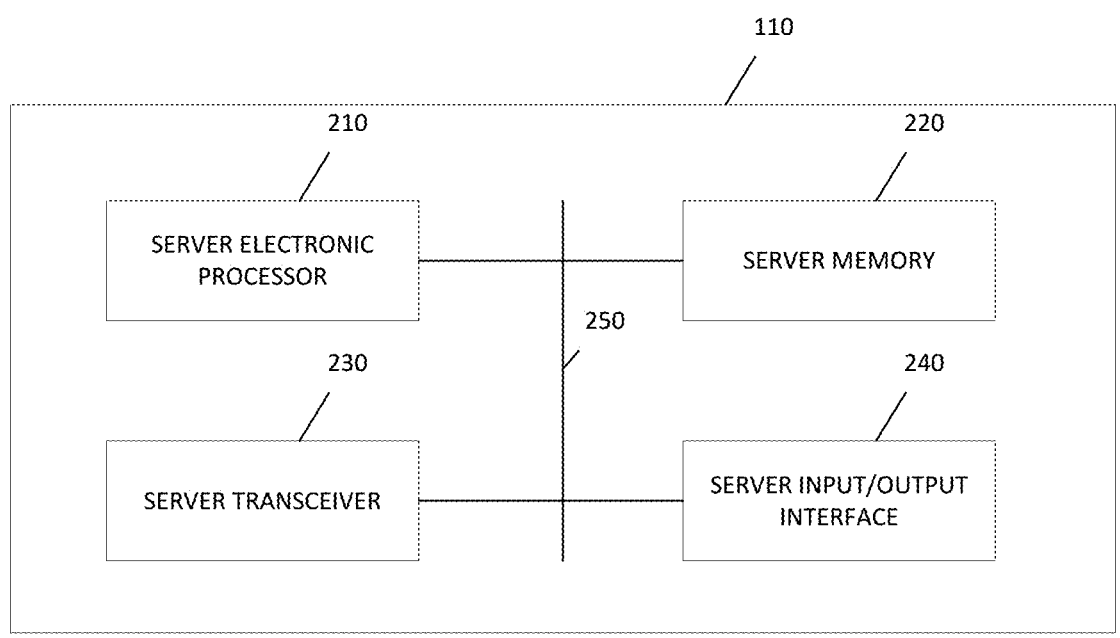
FIG. 2 illustrates an example embodiment of the server of FIG. 1, according to embodiments described herein.

FIG. 2 is a simplified block diagram of an example embodiment of the server 110. In the example illustrated, the server 110 includes a server electronic processor 210, a server memory 220, a server transceiver 230, and a server input/output interface 240. The server electronic processor 210, the server memory 220, the server transceiver 230, and the server input/output interface 240 communicate over one or more control and/or data buses (for example, a communication bus 250). The server 110 may include more or fewer components than those shown in FIG. 2 and may perform additional functions other than those described herein.

In some embodiments, the server electronic processor 210 is implemented as a microprocessor with separate memory, such as the server memory 220. In other embodiments, the server electronic processor 210 may be implemented as a microcontroller (with server memory 220 on the same chip). In other embodiments, the server electronic processor 210 may be implemented using multiple processors. In addition, the server electronic processor 210 may be implemented partially or entirely as, for example, a field programmable gate array (FPGA), an applications-specific integrated circuit (ASIC), and the like and the server memory 220 may not be needed or may be modified accordingly. In the example illustrated, the server memory 220 includes non-transitory, computer-readable memory that stores instructions that are received and executed by the server electronic processor 210 to carry out the functionality of the server 110 described herein. The server memory 220 may include, for example, a program storage area and a data storage area. The program storage area and the data storage area may include combinations of different types of memory, such as read-only memory, and random-access memory. In some embodiments, the server 110 may include one server electronic processor 210, and/or plurality of server electronic processors 210, for example, in a cluster arrangement, one or more of which may be executing none, all, or a portion of the applications of the server 110 described below, sequentially or in parallel across the one or more server electronic processors 210. The one or more server electronic processors 210 comprising the server 110 may be geographically co-located or may be geographically separated and interconnected via electrical and/or optical interconnects. One or more proxy servers or load balancing servers may control which one or more server electronic processors 210 perform any part or all of the applications provided below. While the below description and claims are provided with a single server electronic processor 210 performing all of the functions for simplicity, the functions may be distributed between any of one or more server electronic processors 210. Such a distribution between the any of one or more server electronic processor 210 is within the scope of the claims appended below.

The server transceiver 230 enables wired and/or wireless communication between the server 110, the networked system 100, and the computing device 105. In some embodiments, the server transceiver 230 may comprise separate transmitting and receiving components, for example, a transmitter and a receiver. The server input/output interface 240 may include one or more input mechanisms (for example, a touch pad, a keypad, a joystick, a camera, a microphone, and the like), one or more output mechanisms (for example, a display, a speaker, and the like) or a combination of the two (for example, a touch screen display).

In some implementations the server memory 220 includes one or more penetration testing applications. The penetration testing applications are utilized to perform penetration testing a network of a client and/or a web application hosted on by the client. Generally, penetration testing can be divided into five phases: planning and recognition; scanning; access control; maintaining access; and analysis and reporting. During planning and recognition phase, the scope and objectives of a test are defined, such as, for example the systems to be tested and test methods to be used. Information (e.g., network and domain names, mail server) is gathered to determine how targets work and potential vulnerabilities. For example, the potential vulnerabilities may be issues related to network devices, such as routers, switches, firewalls, and other network infrastructure components. The potential vulnerabilities may also be issues related to applications, such as, software applications, including web applications, mobile applications, and desktop applications. In addition, the potential vulnerabilities may be issues related to an API, a host device, a wireless network, and/or other components of an organization's infrastructure. During scanning phase, the goal is to understand how a target responds to different intrusion attempts. With respect to applications, scanning of the application code can be accomplished using a static analysis or a dynamic analysis. With respect to networks, the network scanning can be accomplished by comparing details about the target attack surface to a database of information about known security holes in services and ports, anomalies in packet construction, and potential paths to exploitable programs or scripts.

The access control phase is a phase where the penetration application(s) and testers attack applications and targets of the network to exploit the vulnerabilities identified in the scanning phase. The exploitation is done to assess how much damage may be caused by the vulnerability. The goal of the maintaining access phase is to determine whether the vulnerability can be utilized to achieve a persistent presence in the exploited system long enough to gain access in depth to obtain the most sensitive data from an organization. During the analysis and reporting phase results of the penetration test are compiled into a reporting that is provided to the client. The reporting includes, for example, specific vulnerabilities exploited, sensitive data accessed, the amount of time that the tester was able to remain undetected in the system, potential solutions, and the like.

Figure 3:
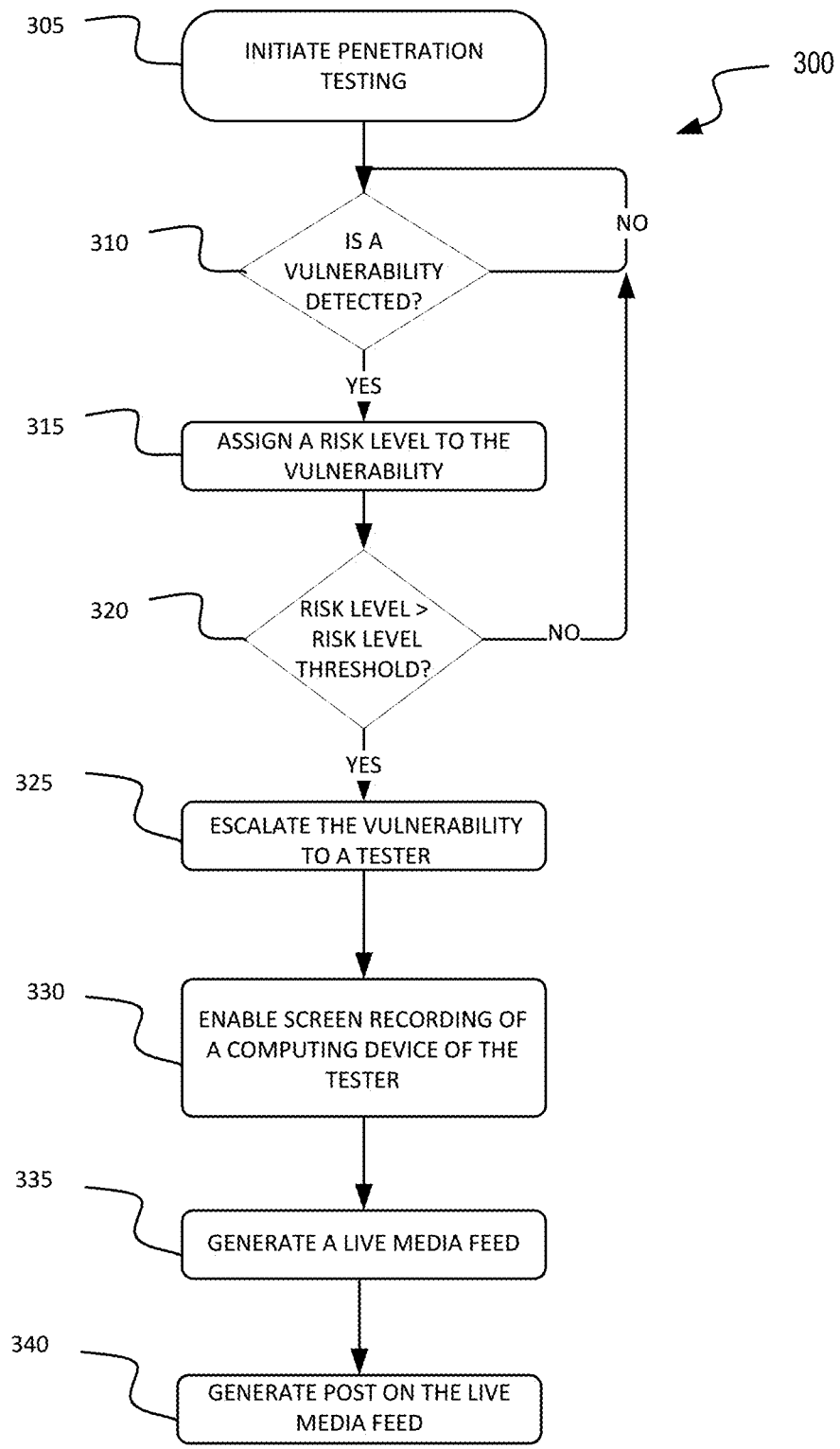
FIG. 3 illustrate a process for reporting penetration results, according to embodiments described herein.

For example, FIG. 3 is a flowchart illustrating a method 300 for reporting penetration testing results, in accordance with some embodiments. The method 300 may be performed by the server 110. In the example illustrated, the method 300 includes initiating, using the server electronic processor 210, penetration testing (at block 305). The server 110 receives an indication from the computing device 105. The indication associated with a selection of a tester to initiate a scan using an internet protocol (IP) address/uniform resource label (URL) of a target of the networked system 100.

The method 300 also includes determining, using the server electronic processor 210, whether a vulnerability is detected (at block 310). The server 110 utilizes instructions, for example, the penetration application(s), stored in the server memory 220 to perform testing of the target of the networked system 100 as discussed above with respect to the scanning and access control phases. In an instance, the server 110 determines that a vulnerability is not present during a scan of a first target of the networked system 100 and proceeds to scan a second target of the networked system 100. In another instance, the server 110 determines that a vulnerability is present during a scan of a first target of the networked system 100, creates an entry related to the vulnerability in the server memory 220, and proceeds to block 315. In this instance, the server, 110 may store additional data associated with the vulnerability and the first target in the entry as well. In some instances, a tester may input commands into a penetration testing command terminal and the penetration testing command terminal returns results of a process performed on the networked system 100 based on the input commands.

The method 300 includes assigning, using the server electronic processor 210, a risk level to the vulnerability (at block 315). The server 110 can access a database of vulnerability risk ratings stored in the server memory 220 and assign a risk level to the detected vulnerability. In some implementations, the risk level is a score based on impact to the networked system 100. In some implementations, the detected vulnerability is assigned to a risk level tier based on the score assigned. In some implementations, the penetration tester manually assigns a risk level by selecting the appropriate risk level from, for example, a dropdown menu.

The method 300 further includes determining, using the server electronic processor 210, whether a risk level is greater than a risk level threshold (at block 320). The server 110 compares the assigned risk level of the detected vulnerability to a risk level threshold. In some implementations, the risk level threshold is a threshold risk score. In other implementations, the risk level threshold is a user defined set of tiers. In an instance, the server 110 determines that the risk level of the vulnerability is less than a risk level threshold and returns to block 310 to scan a second target of the networked system 100. In another instance, the server 110 determines that the risk level of the vulnerability is greater than a risk level threshold and proceeds to block 325.

The method 300 also includes escalating, using the server electronic processor 210, the vulnerability to a tester in response to the risk level exceeding the risk level threshold (at block 325). The server 110 transmits a notification to the computing device 105. The notification may include the detected vulnerability. In addition, or alternatively, the notification may include a link to the detected vulnerability.

The method 300 further includes enabling, using the server electronic processor 210, screen recording of a computing device 105 of the tester (at block 330). The server 110 transmits a signal to activate screen recording of a display device of the computing device 105 to capture manual testing and solutions provided by the tester related to the detected vulnerability. Also, the server 110 can activate a camera and/or microphone of the computing device 105 to capture image and/or audio data associated with the tester. In some instances, the screen recording captures the commands entered into a command terminal of a penetration testing application and the results returned by the penetration testing application. The command terminal and/or the penetration testing application may be a single window or a combination of multiple windows displayed on the display device. The screen recording captures the windows as a video as the commands are entered and the results are returned. In some instances, the server 110 receives a screen recording from the computing device 105 captured by the tester using locally stored recording software (e.g., third party software). In other instances, the tester can capture video using a recording device (e.g., mobile device, camcorder). In these instances, the video may include a physical building security flaw, such as, for example, a lack of security cameras. The tester can utilize the computing device 105 to upload a video file associated with the captured view to the server 110 to generate a post.

The method 300 also includes generating, using the server electronic processor 210, a live media feed (at block 335). The server 110 generates a client application (e.g., client portal, page, or the like) associated with the penetration testing and stores the page in the server memory 220. The server 110 provides a link (e.g., URL) associated with the client application to the client. For example, the client can access a client portal by utilizing the URL in a web browser. The live media feed includes a plurality of posts displayed in a particular order. Each post may include information pertaining to a computer profile of a person initiating the post (that is, entering the text or uploading the file for the post). The server 110 also provides a chat interface that allows clients and testers to communicate with each other regarding posts within the live media feed. In some implementations, the server 110 assigns a timestamp to the generated posts. In some instances, the server 110 utilizes the timestamps to order the generated posts of the live feed, which provides delineation between the generated posts so that the client can follow each post separately.

The method 300 further includes generating, using the server electronic processor 210, a post on the live media feed (at block 340). The live media feed includes a plurality of timestamped posts. The server 110 retrieves one or more detected vulnerabilities and associated information of targets from the server memory 220 and generates a report associated with the results of the penetration testing of the networked system 100. The report may include, for example, a scan summary, scan results, a risk assessment, critical vulnerabilities, other findings, and the like. In some implementations, the server 110 generates a post associated with the penetration testing. The server 110 transmits the generated post to the live feed that includes an aggregation of media content and correspondence (e.g., from the chat interface) between the tester and the client. In some instances, the server 110 transmits the video and audio data associated with escalated vulnerabilities with the generated post. For example, the server 110 generates a post that includes a video (from the corresponding screen recording at block 330) and/or corresponding text associated with the vulnerability report summary or a link to the vulnerability report. In another example, the server 110 receives video and audio data from the computing device 105 in response to a tester receiving a notification associated with a detected vulnerability exceeding a risk threshold. In this example, the server 110 transmits the detected vulnerability, associated information, and the video and audio data of the tester to a URL associated with an active media feed of the client. In other examples, a generated post is associated with initiating a vulnerability scan, specific exploit attempt timeline (e.g., SQL injection of the login page), initiating manual cloud penetration test, stopping of a particular activity, a status update (e.g., parsing scan data, reporting phase, open source intelligence (OSINT) phase), or the like.

In some embodiments, the live media feed includes a plurality of posts generated by the server electronic processor 210 ordered by timestamp. For example, the live media feed includes a first text post based on a text entered by the tester. The first text post is assigned a first timestamp and displayed on the live media feed, for example, at the top of the live media feed. When the testing is being conducted, the screen recording is captured as explained with respect to method 300. The screen recording along with the corresponding text is assigned a second timestamp, the time of the second timestamp being after the time of the first timestamp. The live media feed is regenerated with the screen recording placed at the top of the live media feed and the first text post placed below the screen recording. For each new post generated, the live media feed is regenerated by the server electronic processor 210 with the posts ordered according to their timestamps.

Figure 4:
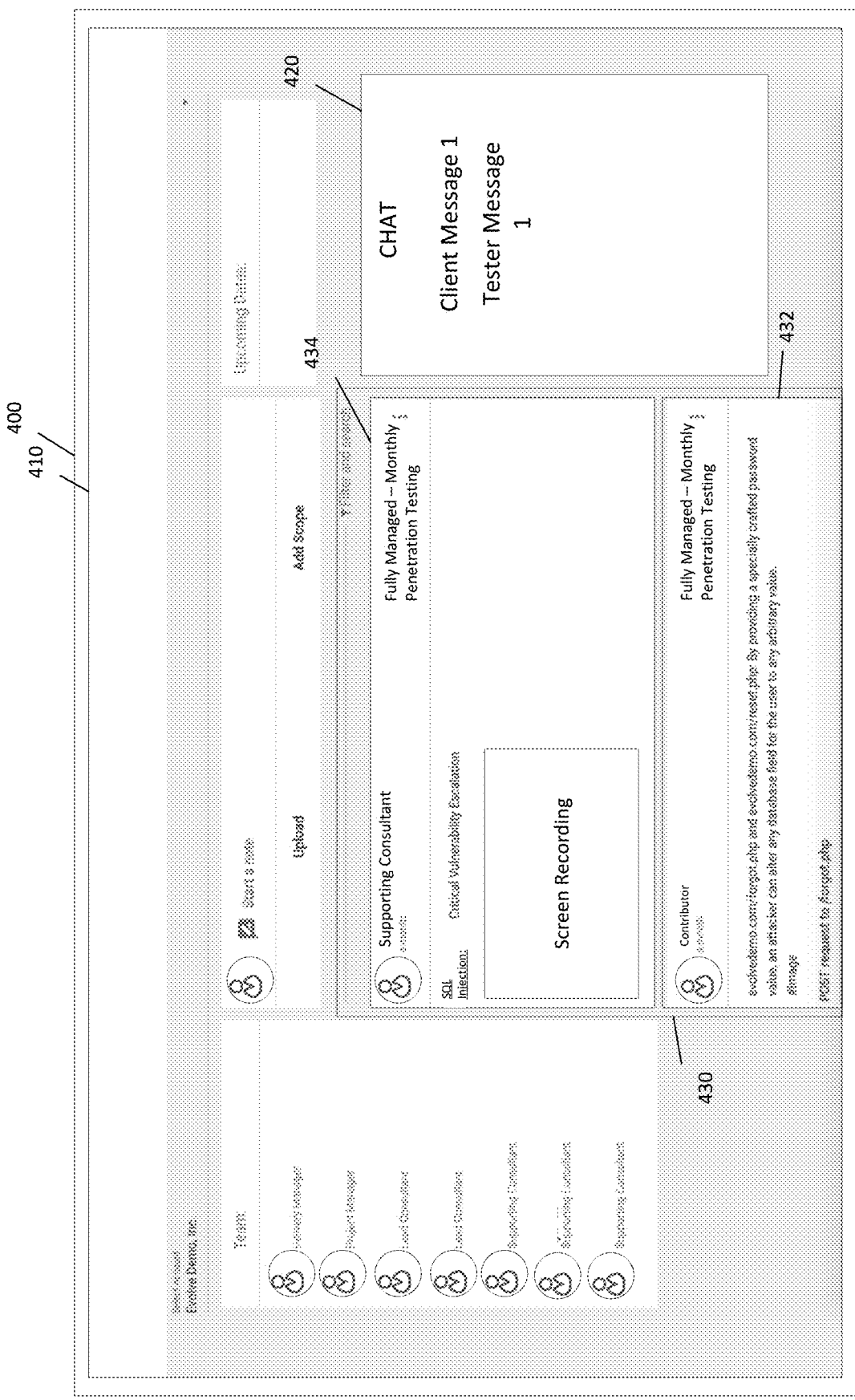
FIG. 4 is a simplified illustration of an example embodiment of a client portal, according to embodiments described herein.

FIG. 4 is a simplified illustration of an example embodiment of a client portal hosted on the server 110. In the example illustrated, a web browser 400 includes a client portal 410. The web browser 400 is an application for accessing and retrieving information of a website. The web browser 400 displays the information of the website on a display device of a computing device of a client. The client portal 410 is an application that is stored on a remote server and delivered over the Internet through a browser interface. The client portal 410 includes chat interface 420 and a live media feed 430. The chat interface 420 is a chat application that allows clients and testers connect with each other in a client-server architecture. The live media feed 430 is an aggregation application that collects content related to penetration testing for a client.

The live media feed 430 includes, for example, a first vulnerability report 432 (for example, a first post) and a second vulnerability report 434 (for example, a second post). The first vulnerability report 432 is, for example, a web application vulnerability report the server 110 generated while testing a web application hosted on a remote server of the client. The second vulnerability report 434 is, for example, a post transmitted to the live media feed 430 by the server 110 after determining that a risk level of an identified vulnerability exceeds the risk threshold. In some instances, the first vulnerability report 432 or the second vulnerability report 434 include a screen recording of a display device of a tester while analyzing the vulnerability and/or performing validation tasks. The first vulnerability report 432 and the second vulnerability report 434 may include, for example, reports or posts related to detected events (for example, vulnerabilities or confirmed secure applications) of a web application, a network, an operating system, a system application, a hardware, a wireless infrastructure, a cloud infrastructure, or the like. In the example illustrated, the client portal 410 allows the server 110 to provide results (e.g., the first vulnerability report 432 and the second vulnerability report 434) of penetration testing of the networked system 100 in real-time.

Figure 5:
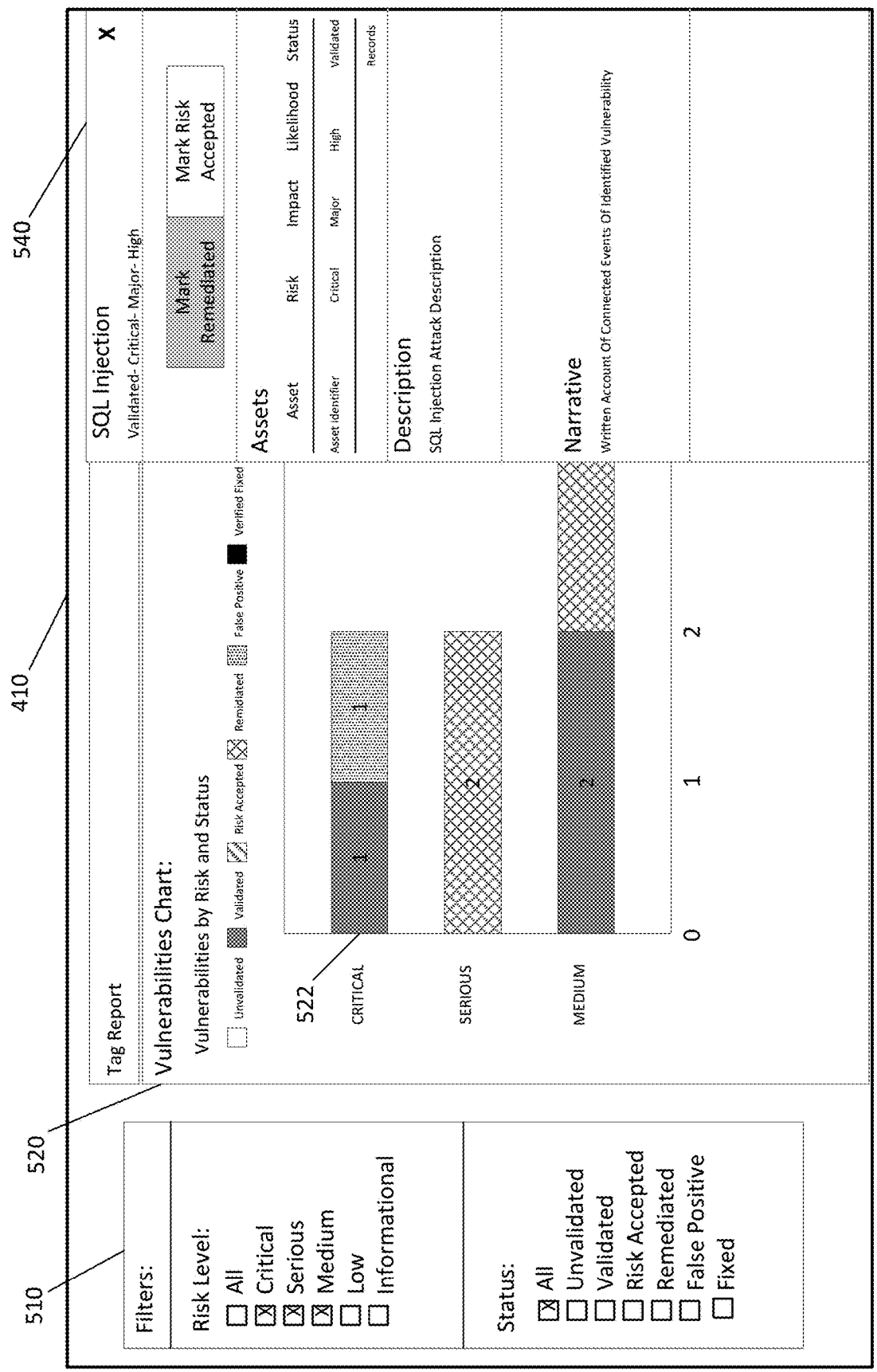
FIG. 5 is a simplified illustration of an example embodiment of a client portal, according to embodiments described herein.

FIG. 5 is a simplified illustration of an example embodiment of a client portal hosted on the server 110. In the example illustrated, a web browser includes the client portal 410. The web browser is an application for accessing and retrieving information of a website. The web browser displays the information of the website on a display device of a computing device of a client. In this example, the client portal 410 includes a filter interface 510, a vulnerability chart 520, and an attack window 540.

The filter interface 510 is an interface that includes one or more sets of filters. For example, the filter interface 510 includes a set of filters (e.g., risk level filters, vulnerability status filters, or other classifications associated with an identified vulnerability) that allow a tester or a client to generate a subset of vulnerabilities from the vulnerabilities identified by the server 110 when testing targets of the networked system 100 as discussed above with respect to the scanning and access control phases. For example, a status assigned to the vulnerabilities identified is related to a review condition of a vulnerability by the tester and/or the server based on predefined rules. In this example, a status may include unvalidated, validated, risk accepted, remediated, false positive, and verified fixed.

The vulnerability chart 520 is a chart of a list of vulnerabilities the server 110 generates in real-time or near real-time and classified based on the filters of the filter interface 510 (e.g., risk level and status). The 'x'-axis of the vulnerability chart 520 depicts the number of identified vulnerabilities. The 'y'-axis of the vulnerability chart 520 depicts a set of categories (e.g., risk levels) associated with the identified vulnerabilities. The vulnerability chart 520 plots the identified vulnerabilities of a category to the number times a vulnerability is identified based a status assigned to the vulnerability.

The attack window 540 is a user interface (e.g., window) generated by the server 110 within the client portal 410. The attack window 540 includes multiple sections that display attack information related to an identified vulnerability of the vulnerability chart 520. In a first section, the attack window 540 includes information related to an attack to exploit the identified vulnerability of the vulnerability chart 520. In a second section, the attack window 540 includes an interactive element (e.g., mark buttons) to update a status of the identified vulnerability of the vulnerability chart 520. For example, the tester or the client can use the mark buttons to update a status of the identified vulnerability. In a third section, the attack window 540 includes a table having a list of records of assets (e.g., targets) of the networked system 100, the list of records related to the vulnerability chart 520. For example, a record can include an asset identifier (e.g., IP address, URL of a target), risk level, impact on the networked system 100, likelihood of success, and status. In a fourth section, the attack window 540 includes a description of the identified attack. In a fifth section, the attack window 540 includes a narrative of events related the identified vulnerability of the vulnerability chart 520.

In the illustrated example embodiment, the server 110 generates the attack window 540 in response to the tester or the client selecting a vulnerability 522. The server 110 retrieves a record related to the vulnerability 522 stored in the server memory 220. The server 110 generates information for the first section and/or the third section of the attack window 540 using the record related to the vulnerability 522. The server 110 provides a description of an SQL injection attack for the fourth section based on a databased of known exploits (e.g., SQL injection attacks) for an identified vulnerability. The server 110 provides a summary of actions performed by the server and/or the tester during the testing of a target of the networked system 100.

Various features and advantages of the present application are set forth in the following claims.

What is claimed is:

1. A server system for reporting penetration test results, comprising:
a memory, and
an electronic processor configured to:
identify a vulnerability of a networked system by testing a target of the networked system;
assign a risk level to the vulnerability;
activate, based on the risk level of the vulnerability, screen recording of a display device of a computing device of a tester;
receive video data associated with the screen recording of the display device;
generate a client application associated with the testing of the target of the networked system, the client application including a live media feed;
generate a link to a vulnerability report summary associated with the penetration test results of the networked system; and
generate, using the vulnerability and the video data, a post on the live media feed including the link to the vulnerability report summary.

2. The system of claim 1, wherein the electronic processor is further configured to:
compare the risk level of the vulnerability to a risk level threshold; and
transmit a notification associated with the vulnerability to the computing device of the tester in response to the risk level of the vulnerability exceeding the risk level threshold.

3. The system of claim 2, wherein the electronic processor is further configured to:
activate at least one of a camera or microphone of the computing device of the tester in response to the risk level of the vulnerability exceeding the risk level threshold.

4. The system of claim 1, wherein the electronic processor is further configured to:
assign timestamps to the post and each of a plurality of posts; and
arrange an order of the post and each of the plurality of posts of the live media feed based on the timestamps.

5. The system of claim 1, wherein the post is an aggregate of media content and correspondence between the tester and a client.

6. The system of claim 1, wherein the risk level assigned to the vulnerability is based on an impact of the vulnerability on the networked system.

7. The system of claim 1, wherein the electronic processor is further configured to:
generate, in real-time, a chart based on the vulnerability and the risk level of the vulnerability; and
generate a window in the client application that includes attack information in response to a user selecting the vulnerability in the chart.

8. The system of claim 7, wherein the electronic processor is further configured to:
update a status of the vulnerability based on a user selection related to an interactive element of the window.

9. The system of claim 7, wherein the chart is generated, in real-time, based at least in part on a status assigned to the vulnerability.

10. A method for reporting penetration test results, comprising:
identifying, with an electronic processor, a vulnerability of a networked system by testing a target of the networked system;
assigning, with the electronic processor, a risk level to the vulnerability;
activating, with the electronic processor, based on the risk level of the vulnerability, screen recording of a display device of a computing device of a tester;
receiving, with the electronic processor, video data associated with the screen recording of the display device;

generating, with the electronic processor, a client application associated with the testing of the target of the networked system, the client application including a live media feed;

generating a link to a vulnerability report summary associated with the penetration test results of the networked system; and generating, with the electronic processor using the vulnerability and the video data, a post on the live media feed including the link to the vulnerability report summary.

11. The method of claim 10, further comprising:
comparing, with the electronic processor, the risk level of the vulnerability to a risk level threshold; and
transmitting, with the electronic processor, a notification associated with the vulnerability to the computing device of the tester in response to the risk level of the vulnerability exceeding the risk level threshold.

12. The method of claim 11, further comprising:
activating, with the electronic processor, at least one of a camera or microphone of the computing device of the tester in response to the risk level of the vulnerability exceeding the risk level threshold.

13. The method of claim 10, further comprising:
assigning, with the electronic processor, timestamps to the post and each of a plurality of posts; and
arranging, with the electronic processor, an order of the post and each of the plurality of posts of the live media feed based on the timestamps.

14. The method of claim 10, wherein the post is an aggregate of media content and correspondence between the tester and a client.

15. The method of claim 10, wherein the risk level assigned to the vulnerability is based on an impact of the vulnerability on the networked system.

16. The method of claim 10, further comprising:
generating, with the electronic processor in real-time, a chart based on the vulnerability and the risk level of the vulnerability; and
generating, with the electronic processor, a window in the client application that includes attack information in response to a user selecting the vulnerability in the chart.

17. The method of claim 16, further comprising:
updating, with the electronic processor, a status of the vulnerability based on a user selection related to an interactive element of the window.

18. The method of claim 16, wherein the chart is generated, in real-time, based at least in part on a status assigned to the vulnerability.

* * * * *